United States Patent
Abe et al.

[11] Patent Number: 5,706,138
[45] Date of Patent: Jan. 6, 1998

[54] ZOOM LENS SYSTEM HAVING A HIGH ZOOM RATIO

[75] Inventors: Tetsuya Abe, Hokkaido; Takayuki Ito; Takashi Enomoto, both of Tokyo, all of Japan

[73] Assignee: Asahi Kogaku Kogyo Kabushiki Kaisha, Tokyo, Japan

[21] Appl. No.: 702,044

[22] Filed: Aug. 23, 1996

[30] Foreign Application Priority Data

Aug. 25, 1995 [JP] Japan .................. 7-217730

[51] Int. Cl.$^6$ .................. G02B 15/14
[52] U.S. Cl. .................. 359/688; 359/775
[58] Field of Search .................. 359/775, 688, 359/676, 684, 686, 771

[56] References Cited

U.S. PATENT DOCUMENTS

| | | |
|---|---|---|
| 4,448,495 | 5/1984 | Hayashi . |
| 4,490,017 | 12/1984 | Okudaira et al. . |
| 4,491,395 | 1/1985 | Okudaira . |
| 4,591,244 | 5/1986 | Aono et al. .................. 359/688 |
| 4,626,076 | 12/1986 | Oshima et al. .................. 359/688 |
| 4,699,474 | 10/1987 | Ozawa . |
| 4,749,267 | 6/1988 | Mihara . |
| 4,770,510 | 9/1988 | Mukaiya . |
| 4,812,024 | 3/1989 | Mukaiya . |
| 4,824,226 | 4/1989 | Tanaka . |
| 4,846,563 | 7/1989 | Mukaiya . |
| 4,948,234 | 8/1990 | Mihara . |
| 4,948,239 | 8/1990 | Estelle . |
| 5,056,900 | 10/1991 | Mukaiya et al. . |
| 5,061,051 | 10/1991 | Miyamae . |
| 5,080,473 | 1/1992 | Ishii . |
| 5,146,366 | 9/1992 | Mukaiya . |
| 5,221,995 | 6/1993 | Yoneyama . |
| 5,223,979 | 6/1993 | Yoneyama . |
| 5,225,937 | 7/1993 | Horiuchi . |
| 5,282,089 | 1/1994 | Abe . |
| 5,371,630 | 12/1994 | Ito et al. . |
| 5,513,045 | 4/1996 | Ito et al. . |
| 5,557,472 | 9/1996 | Ito et al. . |

FOREIGN PATENT DOCUMENTS

| | | |
|---|---|---|
| 7-63986 | 3/1995 | Japan . |
| 7-63989 | 3/1995 | Japan . |

Primary Examiner—Hoa Q. Pham
Attorney, Agent, or Firm—Greenblum & Bernstein P.L.C.

[57] ABSTRACT

A zoom lens system having a high zoom ratio and a high aperture ratio includes a first lens group having a positive power, a second lens group having a negative power, a third lens group having a negative power, and a fourth lens group having a positive power. The second lens group has a magnification varying function and is moved during a zooming operation. The third lens group has a focus compensating function and is moved during the zooming operation. The fourth lens group has an image forming function and is not moved during the zooming operation.

5 Claims, 7 Drawing Sheets

-0.5   0.5
SPHERICAL
ABERRATION
SINE CONDITION

FIG. 2B
1: 1.7

——— d LINE
········ g LINE
--- C LINE

-0.5   0.5
SPHERICAL
ABERRATION
CHROMATIC
ABERRATION

-0.5   0.5
ASTIGMATISM

FIG. 2D
W= 26.8°

-5   5  %
DISTORTION

FIG. 7A
1: 1.7
—— SA
-- SC
-0.5  0.5
SPHERICAL
ABERRATION
SINE CONDITION

FIG. 7B
1: 1.7
—— d LINE
······ g LINE
--- C LINE
-0.5  0.5
SPHERICAL
ABERRATION
CHROMATIC
ABERRATION

FIG. 7C
W= 5.5°
—— S
-- M
-0.5  0.5
ASTIGMATISM

FIG. 7D
W= 5.5°
-5  5  %
DISTORTION

FIG. 8A
1: 2.4
—— SA
-- SC
-0.5  0.5
SPHERICAL
ABERRATION
SINE CONDITION

FIG. 8B
1: 2.4
—— d LINE
······ g LINE
--- C LINE
-0.5  0.5
SPHERICAL
ABERRATION
CHROMATIC
ABERRATION

FIG. 8C
W= 1.9°
—— S
-- M
-0.5  0.5
ASTIGMATISM

FIG. 8D
W= 1.9°
-5  5  %
DISTORTION

-0.5　0.5
SPHERICAL
ABERRATION
SINE CONDITION

FIG. 10B
1:1.7

— d LINE
--- g LINE
--- C LINE

-0.5　0.5
SPHERICAL
ABERRATION
CHROMATIC
ABERRATION

-0.5　0.5
ASTIGMATISM

FIG. 10D
W= 27.0°

-5　5 %
DISTORTION

FIG. 11A
1: 1.7

-0.5  0.5
SPHERICAL
ABERRATION
SINE CONDITION

-0.5  0.5
SPHERICAL
ABERRATION
CHROMATIC
ABERRATION

— d LINE
···· g LINE
--- C LINE

FIG. 11C
W= 5.6°

-0.5  0.5
ASTIGMATISM

-5  5  %
DISTORTION

FIG. 12A
1: 2.4

-0.5  0.5
SPHERICAL
ABERRATION
SINE CONDITION

-0.5  0.5
SPHERICAL
ABERRATION
CHROMATIC
ABERRATION

— d LINE
···· g LINE
--- C LINE

FIG. 12C
W= 1.9°

-0.5  0.5
ASTIGMATISM

-5  5  %
DISTORTION

FIG. 13

ZOOM LENS SYSTEM HAVING A HIGH ZOOM RATIO

BACKGROUND OF THE INVENTION

1. Field of the Invention

The present invention relates to a compact zoom lens system having a high zoom ratio approximately equal to 15, and which is applicable for use in a small TV camera, such as a CCTV camera.

2. Description of the Related Art

In a small TV camera, such as a CCTV camera, it is necessary for a zoom lens to have a high aperture ratio and a high zoom ratio. However, in general, if the aperture ratio is high and is approximately 1.2, the zoom ratio is less than 10, and conversely, if the zoom ratio is higher than 10, the aperture ratio is small and is approximately 2.

SUMMARY OF THE INVENTION

It is an object of the present invention to provide a compact and highly efficient zoom lens system in which the aperture ratio at the shortest focal length extremity, and the zoom ratio, can be increased to be approximately F1.7 and 15, respectively, in response to a miniaturization of an image pickup device.

To achieve the object mentioned above, according to the present invention, there is provided a zoom lens system having a first lens group having a positive power, a second lens group having a negative power, a third lens group having a negative power, and a fourth lens group having a positive power, arranged in this order from an object side. The second lens group has a magnification varying function and is moved during a zooming operation. The third lens group has a focus compensating function and is moved during the zooming operation. The fourth lens group has an image forming function and is not moved during the zooming operation. The fourth lens group consists of a first sub-lens group and a second sub-lens group, each having a positive power, in this order from the object side. The first and second sub-lens groups are spaced having a predetermined distance therebetween. The zoom lens system satisfies relationships (1) through (5):

(1) $0.25 < L_{W2-3}/f_T < 0.4$ (2) $0.2 < |m_{2W}| < 0.4$ $(m_{2W} < 0)$ (3) $1.0 < |m_4| < 1.4$ $(m_4 < 0)$ (4) $0.5 < m_{4b} < 0.9$ (5) $1.3 < f_4/f_{4a} < 2.5$ wherein $L_{W2-3}$ represents the distance between the second lens group and the third lens group at the shortest focal length extremity, $f_T$ represents the focal length of the whole lens system at the longest focal length extremity, $m_{2W}$ represents the lateral magnification of the second lens group at the shortest focal length extremity, $m_4$ represents the lateral magnification of the fourth lens group, $m_{4b}$ represents the lateral magnification of the second sub-lens group of the fourth lens group, $f_4$ represents the focal length of the fourth lens group, and $f_{4a}$ represents the focal length of the first sub-lens group of the fourth lens group.

The focusing is carried out by moving the first lens group in an optical axis direction.

Preferably, the first sub-lens group of the fourth lens group consists of a positive first lens element, a positive second lens element, and a cemented lens consisting of a positive lens element and a negative lens element, in this order from the object side, and preferably satisfies relationship (6):

(6) $-0.35 < f_{4a}/f_{4ac} < -0.15$ wherein $f_{4ac}$ represents the focal length of the cementing surface of the cemented lens belonging to the first sub-lens group of the fourth lens group, represented by relationship (6'):

(6') $f_{4ac} = r_c/(N'-N)$ wherein $r_c$ represents the radius of curvature of the cementing surface, N' represents the refractive index of the lens closer to an image surface than the cementing surface at the d-line, and N represents the refractive index of the lens closer to the object side than the cementing surface at the d-line.

Preferably, the second sub-lens group of the fourth lens group consists of three lens elements including a positive lens element, a negative lens element, and a positive lens element, in this order from the object side, or two lens elements including a negative lens element and a positive lens element, in this order from the object side, and preferably satisfies relationships (7), (8) and (9):

(7) $0.4 < f_{4a}/f_{4b} < 0.8$ (8) $-2.5 < f_{4b}/f_{4bN} < -1.0$ (9) $2.0 < L_{4ab}/f_W < 4.0$ wherein $f_{4b}$ represents the focal length of the second sub-lens group of the fourth lens group, $f_{4bN}$ represents the focal length of the negative lens element of the second sub-lens group, $f_W$ represents the focal length of the whole lens system at the shortest focal length extremity, and $L_{4ab}$ represents the distance between the first sub-lens group and the second sub-lens group.

Preferably, an aperture is provided between the third lens group and the fourth lens group, and is secured to the fourth lens group so as not to move during the zooming operation.

The present disclosure relates to subject matter contained in Japanese Patent Application No. 7-217730 (filed on Aug. 25, 1995) which is expressly incorporated herein by reference in its entirety.

BRIEF DESCRIPTION OF THE DRAWINGS

The present invention will be described below in detail with reference to the accompanying drawings, in which similar elements are indicated by similar reference numerals, and wherein.

DESCRIPTION OF THE PREFERRED EMBODIMENTS

A zoom lens system according to the present invention includes four lens groups in which a fourth lens group does not move during a zooming operation. The magnification varying operation is mainly carried out by a movement of a negative second lens group.

Figure 13:
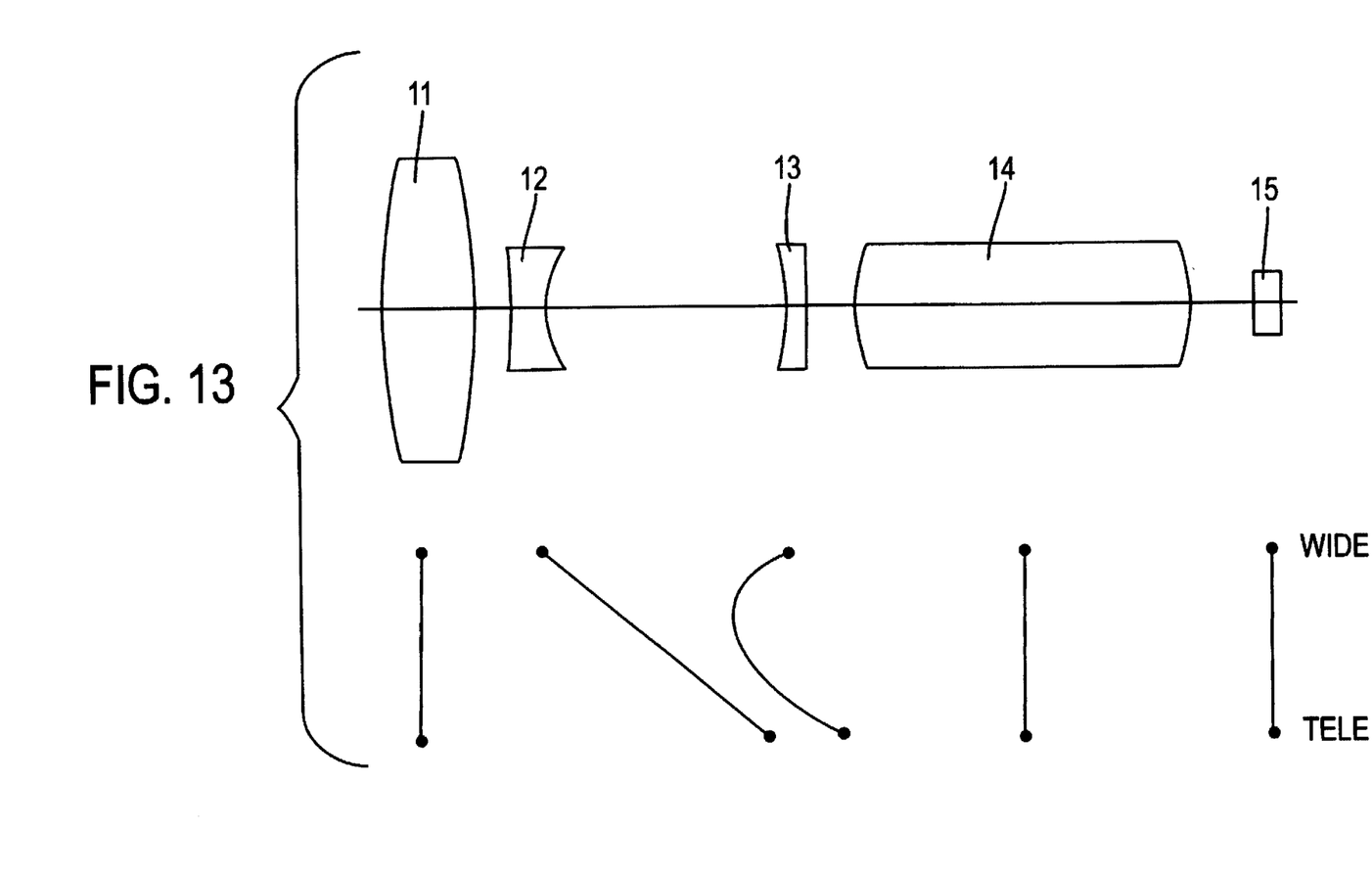

FIG. 13 shows zooming tracks of each of the lens groups (elements 11, 12, 13 and 14) of the zoom lens system. Generally, to increase the zoom ratio in the zoom lens system as constructed above, it is necessary to increase the distance between the second lens group and a third lens group at the shortest focal length extremity, i.e., at the "wide" end. However, this results in a large zoom lens system. In the present invention, the fourth lens group is constructed to meet the requirements specified in relationships (3), (4) and (5), and in addition to the foregoing, the distance between the second lens group and the third lens group at the shortest focal length extremity is set to be smaller than the focal length at the longest focal length extremity, as specified in relationship (1).

If the ratio defined in relationship (1) is below the lower limit, the miniaturization of the zoom lens system can be realized, but it is necessary to enhance the zoom ratio without increasing the displacement of the second lens group, thus leading to an increase in the fluctuation of aberrations during the- zooming operation. Conversely, if the ratio defined in relationship (1) is above the upper limit, no miniaturization of the zoom lens system can be achieved.

Moreover, since the magnification is varied mainly by the movement of the second lens group as mentioned above, the lateral magnification of the second lens group at the shortest focal length extremity is set to be small, as specified in relationship (2), in comparison with a conventional zoom lens having a relatively small zoom ratio.

If the lateral magnification of the second lens group specified in relationship (2) is smaller than the lower limit, it is impossible to obtain a high zoom ratio without increasing the displacement of the second lens group. The increase in the displacement of the second lens group leads to an increase in the size of the zoom lens system. Conversely, if the lateral magnification of the second lens group is above the upper limit in relationship (2), the lateral magnification ($m_{2T}$) is too large to correct the fluctuation of the aberrations caused during the zooming operation, since the lateral magnification ($m_{2T}$) at the longest focal length extremity is substantially identical to a product of the lateral magnification ($m_{2W}$) at the shortest focal length extremity and the zoom ratio (i.e., $m_{2T} \approx \alpha \cdot m_{2W}$, wherein $\alpha$ represents the zoom ratio).

Relationship (3) specifies the lateral magnification of the fourth lens group having an image forming function. The focal length of the whole lens system is represented by the product of the resultant focal length of the lens groups having the variable power (first through third lens groups) and the lateral magnification of the fourth lens group. To make the variable power lens groups small, the lateral magnification of the fourth lens group, i.e., $|m_4|$, is selected to be slightly larger than 1, as specified in relationship (3). If the lateral magnification of the fourth lens group increases, the focal length of the variable power lens groups can be reduced. In a zoom lens system whose half angle of view is relatively small to be within a range of 27° to 2°, the reduced focal length of the variable power lens groups contributes to a reduction of the length of the whole lens system. If the lateral magnification of the fourth lens group is larger than the upper limit specified in relationship (3), the zoom lens system can be miniaturized, but the aberrations caused by the variable power lens groups are enhanced in the fourth lens group. Thus, the fluctuation of the aberrations caused during the zooming operation becomes large. The fourth lens group can correct average aberration caused by the variable power lens groups but cannot correct the fluctuation of the aberrations. If the lateral magnification of the fourth lens group is smaller than the lower limit specified in relationship (3), no miniaturization of the zoom lens system can be realized.

The fourth lens group consists of a first sub-lens group and a second sub-lens group in this order from an object side.

Relationship (4) specifies the lateral magnification of the second sub-lens group of the fourth lens group to balance the correction of the aberrations by the fourth lens group. If the lateral magnification of the second sub-lens group is above the upper limit specified in relationship (4), the zoom lens system can be miniaturized, but the power of the first sub-lens group is increased, and hence, it is difficult to effectively correct the aberrations (particularly, spherical aberrations) of a zoom lens having a large aperture ratio approximately equal to F1.7. If the lateral magnification of the second sub-lens group of the fourth lens group is below the lower limit specified in relationship (4), the aberrations can be effectively corrected but the whole length of the fourth lens group is increased contrary to the desire for miniaturization.

Relationship (5) specifies the power of the first sub-lens group belonging to the fourth lens group. The power of the first sub-lens group is large in comparison with conventional zoom lenses to miniaturize the lens system. If the power is smaller than the lower limit specified in relationship (5), neither a high zoom ratio nor a miniaturization of the lens system can be obtained. If the power is larger than the upper limit specified in relationship (5), the zoom lens system can be made small but it is difficult to obtain a small F-number which is approximately equal to 1.7.

The first sub-lens group preferably consists of a positive lens element, a positive lens element, and a cemented lens consisting of a positive lens element and a negative lens element cemented thereto, in this order from the object side. The two positive lens elements positioned nearest to the object side are preferably used to obtain a large aperture, the F-number of which is approximately 1.7.

Since the first sub-lens group has a large positive power as specified in relationship (5), it is preferable to provide a negative lens element to correct the aberration within the first sub-lens group. However, if a separate negative lens element is provided, the optical performance can deteriorate due to an error in the distance between the negative lens element and the adjacent front or rear lens element, or due to a deviation or decentering of the lens elements. To prevent this, the negative lens element is preferably cemented to the positive lens element.

Relationship (6) is related to the cemented lens of the first sub-lens group. If the ratio specified in relationship (6) is larger than the upper limit, it is difficult to satisfactorily correct the aberration in the first sub-lens group. If the ratio is smaller than the lower limit, a high-order spherical aberration is caused due to an over-correction.

Relationship (7) specifies the power ratio between the first sub-lens group and the second sub-lens group of the fourth lens group. It is preferable that the power of the second sub-lens group is smaller than the power of the first sub-lens group from the viewpoint of a miniaturization of the lens system and correction of aberrations.

The image forming function of the fourth lens group relies mainly upon the first sub-lens group. The second sub-lens group is adapted to supplement the image forming function of the first sub-lens group and balance the correction of the off-axis astigmatism, curvature of field, or distortion. To this end, if the power of the second sub-lens group increases so that the ratio specified in relationship (7) is above the upper limit, the power of the first sub-lens group becomes relatively small, and hence the whole length of the fourth lens group is increased. If the power of the second sub-lens group becomes small so that the ratio specified in relationship (7) is below the lower limit, the burden of an image formation on the first sub-lens group is enhanced, thus resulting in an imbalance of aberrations in the fourth lens group.

The second sub-lens group preferably consists of one negative lens and at least one positive lens.

Relationship (8) is related to the negative lens element of the second sub-lens group. If the value of the ratio specified in relationship (8) is smaller than the lower limit, the negative power of the negative lens element of the second sub-lens group becomes so large that an over correction of the astigmatism and the distortion occurs. Consequently, it is difficult to correct the astigmatism in the focal length range from the shortest focal length extremity to an intermediate focal length and the distortion on the long focal length side, thus resulting in unbalanced aberrations. If the value of the ratio specified in relationship (8) is larger than the upper limit, no aberrations produced in the first sub-lens group can be corrected.

Relationship (9) defines the spatial distance between the first sub-lens group and the second sub-lens group. If the spatial distance is appropriately set to meet the requirement specified by relationship (9), the fourth lens group can be made compact, while keeping the aberrations in a well balanced state. If the value of the ratio specified by relationship (9) is larger than the upper limit, the whole length of the fourth lens group is increased, contrary to the desire to make the zoom lens system compact. If the value of the ratio specified in relationship (9) is smaller than the lower limit, it is difficult to correct the astigmatism, curvature of field, and distortion.

A diaphragm (aperture stop) is provided between the variable power lens groups (1st–3rd lens groups) and the fourth lens group. The diaphragm does not move during the zooming operation. This arrangement simplifies the mechanical structure of a lens barrel and reduces the diameter of the first lens group at a high zoom ratio.

In general, a CCTV camera is provided with an ND filter in the vicinity of the diaphragm to expand the range of adjustment of the quantity of light. To prevent an occurrence of ghost images of the image pickup surface and the ND filter, it is preferable that the diaphragm be provided between the variable power lens groups having a large negative power and the fourth lens group having a large positive power.

Several examples (embodiments) of the present invention will be discussed below.

Figure 1A:
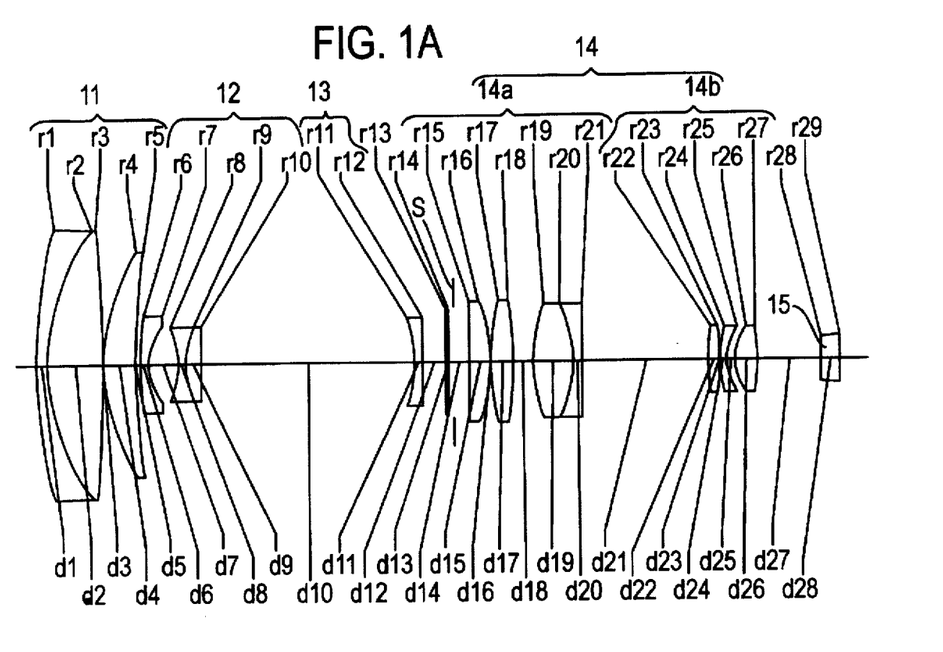
FIG. 1 is a schematic view of a lens arrangement of a zoom lens system having a high zoom ratio, according to a first embodiment of the present invention.
Figure 2A:
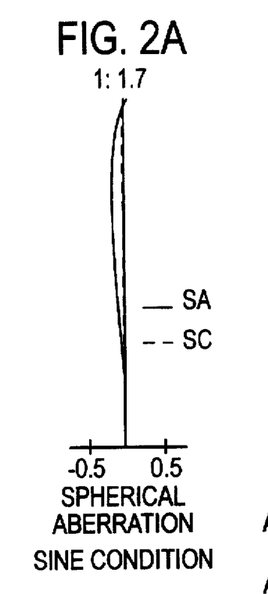
FIGS. 2A, 2B, 2C and 2D show aberration diagrams of the zoom lens system shown in FIG. 1, at a shortest focal length extremity.
Figures 2B, 2C:
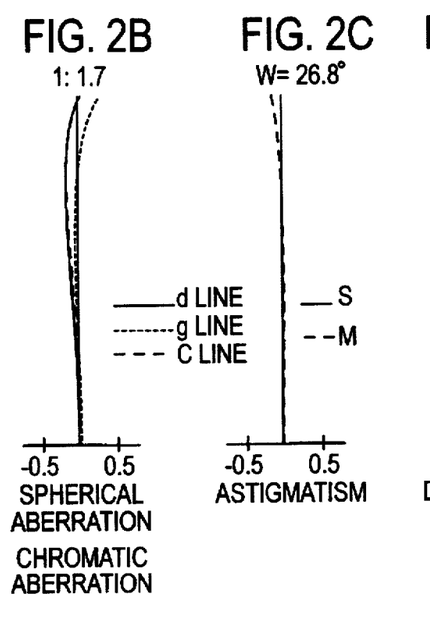
Figure 2D:
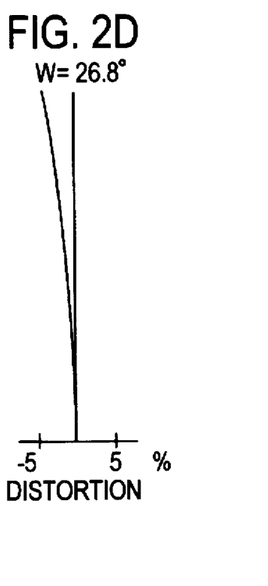
Figure 3A:
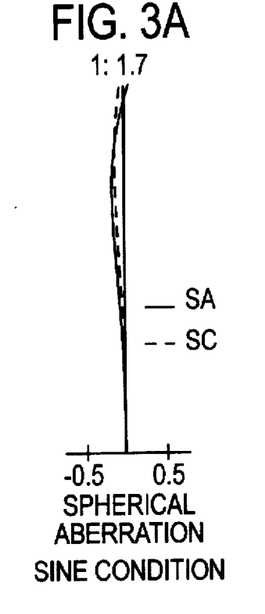
FIGS. 3A, 3B, 3C and 3D show aberration diagrams of the zoom lens system shown in FIG. 1, at an intermediate focal length.
Figures 3B, 3C, 3D:
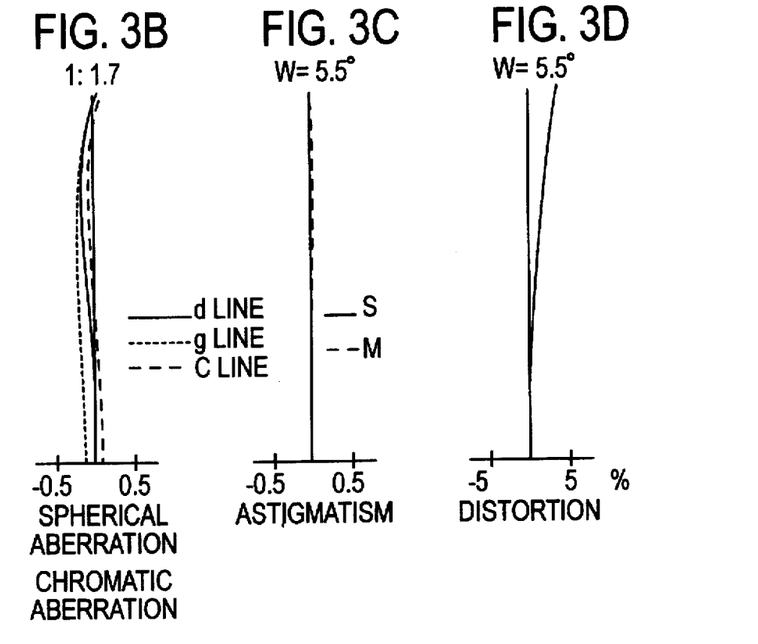
Figure 4A:
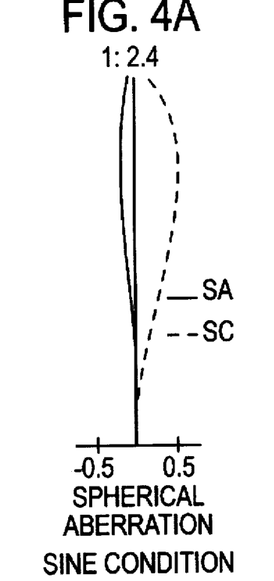
FIGS. 4A, 4B, 4C and 4D show aberration diagrams of the zoom lens system shown in FIG. 1, at a longest focal length extremity.
Figures 4B, 4C, 4D:
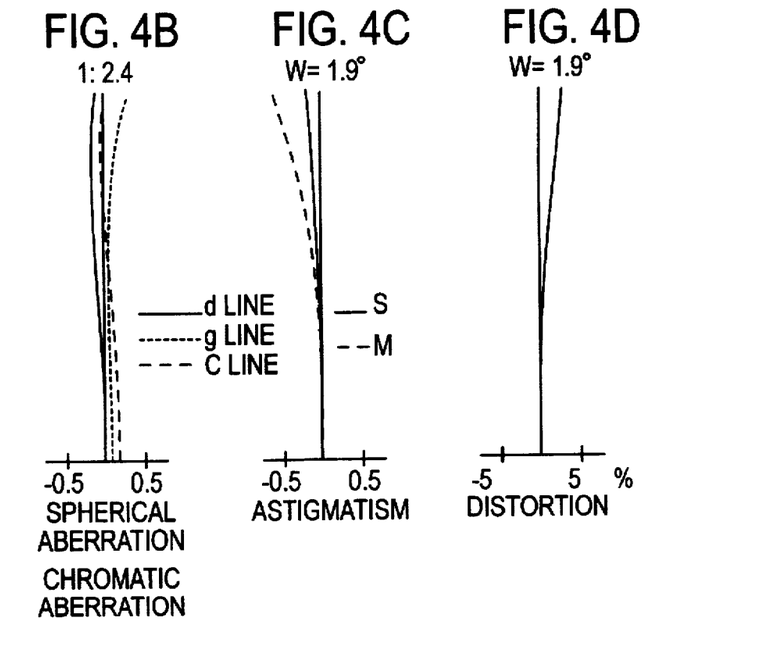
Figure 5:
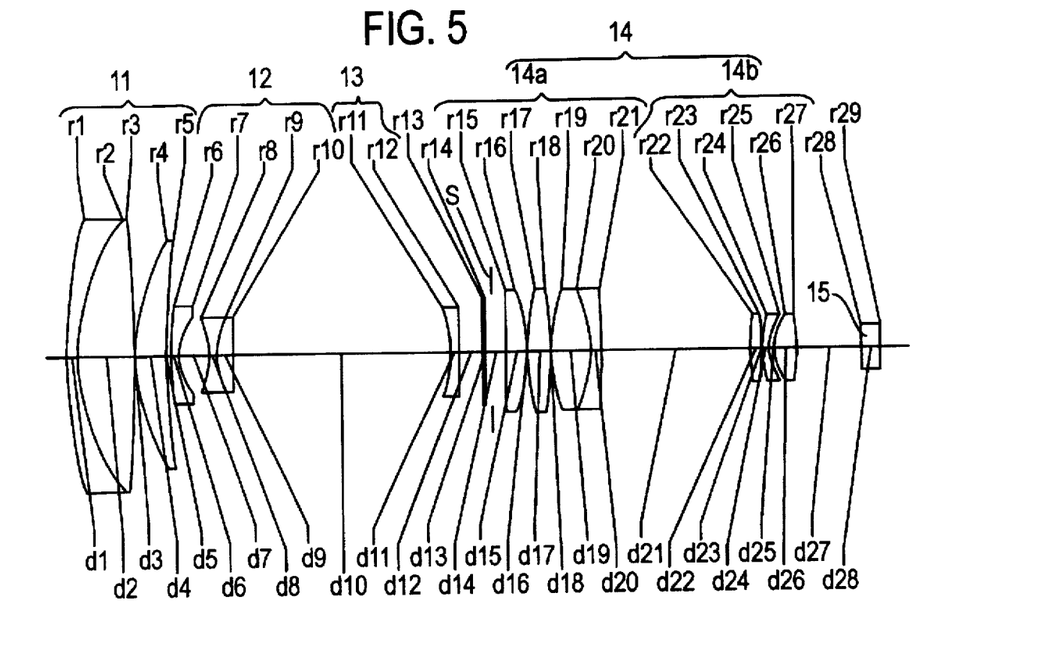
FIG. 5 is a schematic view of a lens arrangement of a zoom lens system having a high zoom ratio according to a second embodiment of the present invention.
Figure 6A:
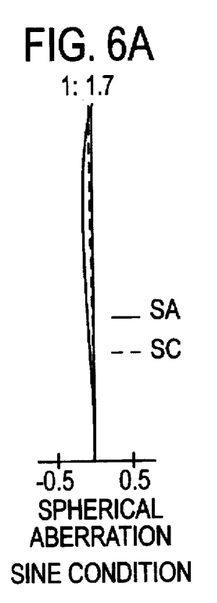
FIGS. 6A, 6B, 6C and 6D show aberration diagrams of the zoom lens system shown in FIG. 5, at a shortest focal length extremity.
Figures 6B, 6C:
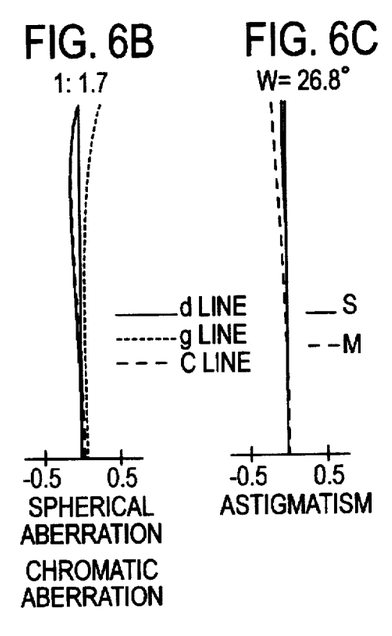
Figure 6D:
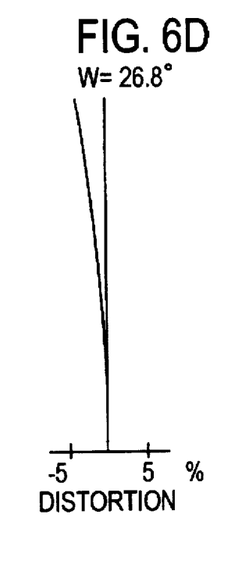
Figure 7A:
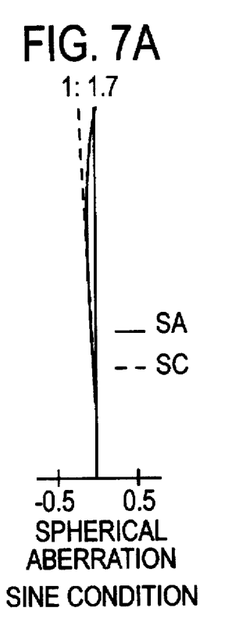
FIGS. 7A, 7B, 7C and 7D show aberration diagrams of the zoom lens system shown in FIG. 5, at an intermediate focal length.
Figures 7B, 7C:
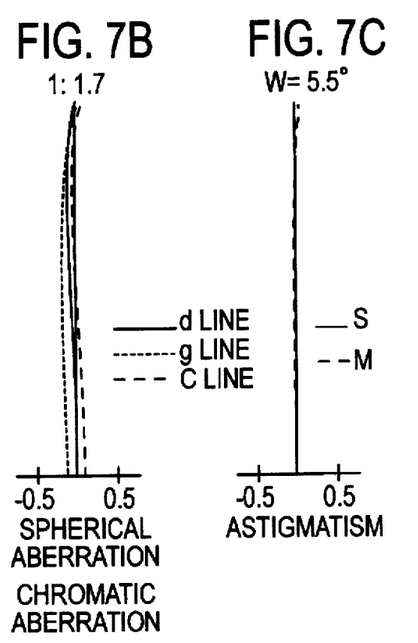
Figure 7D:
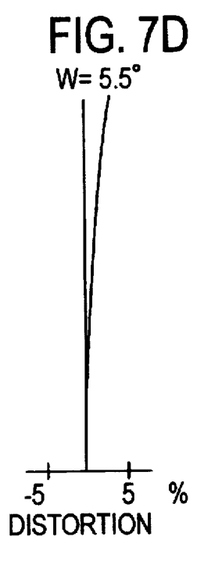
Figure 8A:
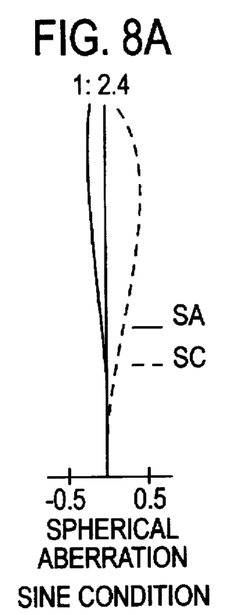
FIGS. 8A, 8B, 8C and 8D show aberration diagrams of the zoom lens system shown in FIG. 5, at a longest focal length extremity.
Figures 8B, 8C:
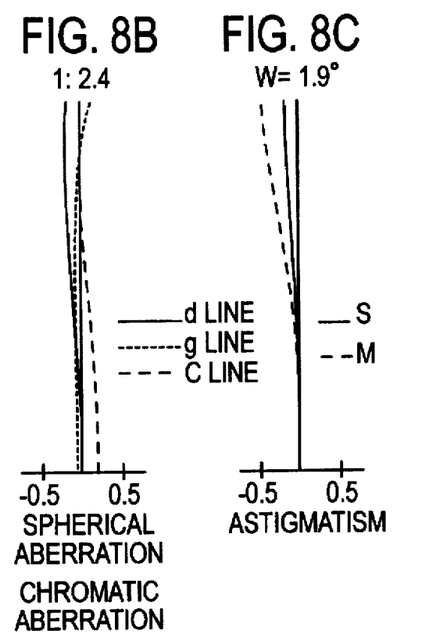
Figure 8D:
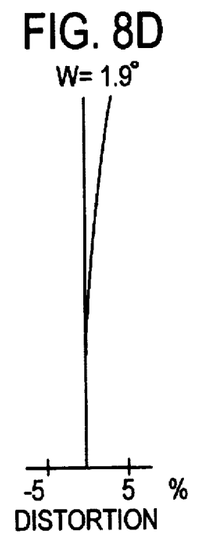
Figure 9:
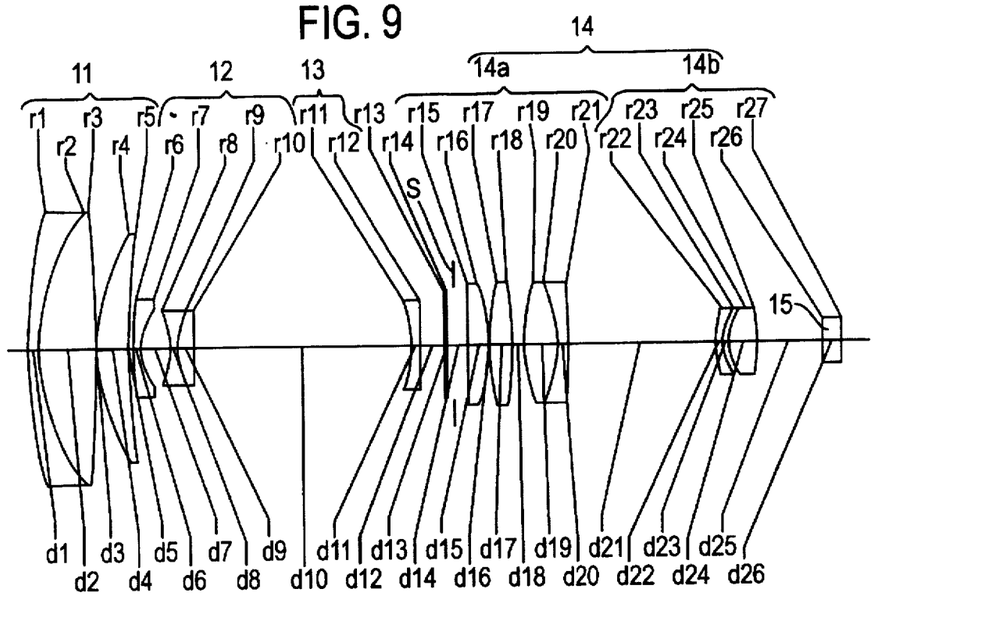
FIG. 9 is a schematic view of a lens arrangement of a zoom lens system having a high zoom ratio according to a third embodiment of the present invention.
Figure 10A:
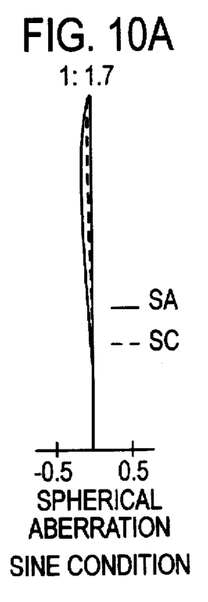
FIGS. 10A, 10B, 10C and 10D shows aberration diagrams of the zoom lens system shown in FIG. 9, at a shortest focal length extremity.
Figures 10B, 10C:
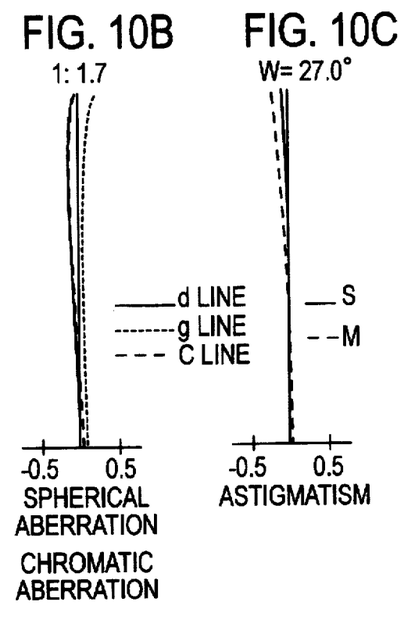
Figure 10D:
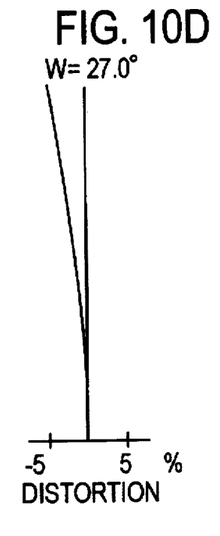
Figure 11A:
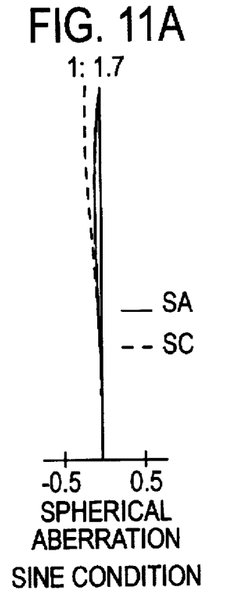
FIGS. 11A, 11B, 11C and 11D show aberration diagrams of the zoom lens system shown in FIG. 9, at an intermediate focal length.
Figures 11B, 11C:
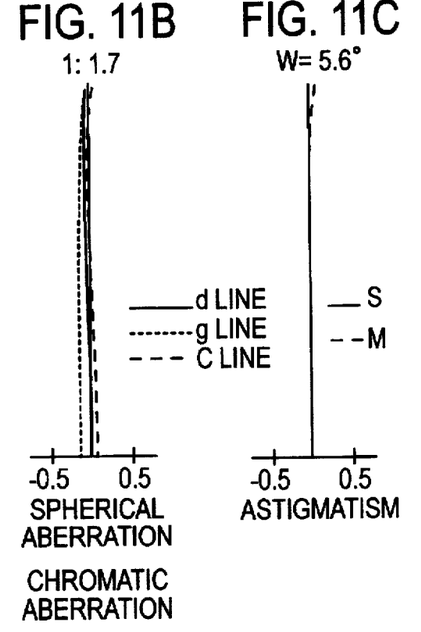
Figure 11D:
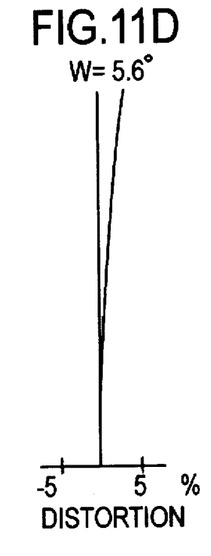
Figure 12A:
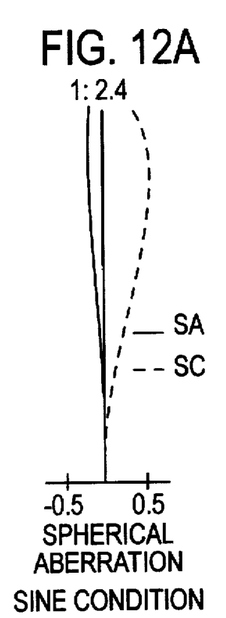
FIGS. 12A, 12B, 12C and 12D show aberration diagrams of the zoom lens system shown in FIG. 9, at a longest focal length extremity; and, FIG. 13 shows zoom track diagrams of a zoom lens system according to the embodiments.
Figures 12B, 12C:
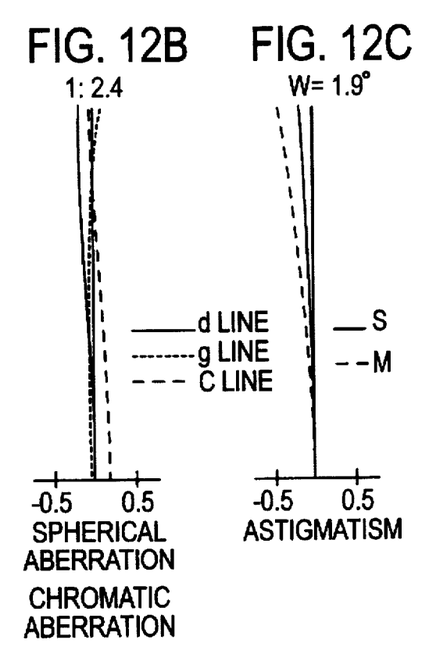
Figure 12D:
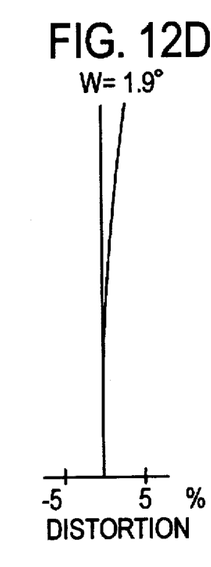

FIGS. 1, 5 and 9 respectively show lens arrangements of the first, second and third embodiments of the present invention.

In the first, second and third embodiments, the lens system consists of a positive first lens group 11, a negative second lens group 12, a negative third lens group 13, and a positive fourth lens group 14, in this order from an object side (the left side of FIGS. 1, 5 and 9). The first lens group 11 consists of three lens elements, two of which are cemented together (surface Nos. 1 to 5). The second lens group 12 consists of three lens elements, two of which are cemented together (surface Nos. 6 to 10). The third lens group 13 consists of a single lens element (surface Nos. 11 and 12).

In FIGS. 1, 5 and 9, surface Nos. 13 and 14 positioned at the rear (i.e., to the right in FIGS. 1, 5 and 9) Of the third lens group 13 define an ND filter which is provided in front of a diaphragm S. The ND filter controls the quantity of light. The ND filter has no influence on the aberration.

In the first and second embodiments, the fourth lens group 14 consists of a first sub-lens group 14a having surface Nos. 15 to 21 and a second sub-lens group 14b having surface Nos. 22 to 27.

In the third embodiment (FIG. 9), the fourth lens group 14 consists of a first sub-lens group 14a having surface Nos. 15 to 21, and a second sub-lens group 14b having surface Nos. 22 to 25.

Surface Nos. 28 and 29 in the first and second embodiments and surface Nos. 26 and 27 in the third embodiment define a glass cover 15 provided in front of the CCD (not shown), respectively. Note that in practice, the glass cover 15 is integrally provided with a filter but is referred to as a single glass cover. The maximum distance between the adjacent lens elements within the fourth lens group 14 is indicated by $d_{2r}$.

The first, second and third embodiments will be described with reference to the following tables and the attached drawings, in which "$F_{NO}$" represents the F-number, "f" represents the focal length, "ω" represents the half angle of view, "$f_B$" represents the back focal distance (distance between the last lens element and the image pickup surface of the CCD including the glass cover 15; the image pickup surface is identical to the second surface of the glass cover in the illustrated embodiments), "ri" represents the radius of curvature of each lens surface, "di" represents the lens thickness or distance between adjacent lens elements, "N" represents the refractive index of the d-line, and "ν" represents the Abbe number of the d-line. In the aberration diagrams (FIGS. 2A through 2D, 3A through 3D, 4A through 4D, 6A through 6D, 7A through 7D, 8A through 8D, 10A through 10D, 11A through 11D and 12A through 12D) "SA" represents the spherical aberration, "SC" represents the sine condition, "d-line", "g-line" and C-line" represent the chromatic aberrations represented by spherical aberrations, at the respective wavelengths, "S" the sagittal rays, and "M" the meridional rays, respectively.

<Embodiment 1>

A lens arrangement of the zoom lens system having a high zoom ratio according to the first embodiment is shown in FIG. 1. Numerical data regarding the first embodiment is shown in Table 1 below. Aberrations at the shortest focal length extremity, an intermediate focal length, and the longest focal length extremity are shown in FIGS. 2A through 2D, 3A through 3D and 4A through 4D, respectively.

TABLE 1

$F_{NO}$ = 1: 1.7–1.7–2.4
f = 8.24–40.00–116.50
ω = 26.8–5.5–1.9
$f_B = d_{27} + d_{28} = 15.20$

| surface No. | r | d | N | ν |
|---|---|---|---|---|
| 1 | 110.000 | 2.00 | 1.80518 | 25.4 |
| 2 | 46.684 | 10.80 | 1.62041 | 60.3 |
| 3 | –312.400 | 0.10 | — | — |
| 5 | 152.991 | 0.92–30.26–38.86 | — | — |
| 6 | 77.586 | 1.30 | 1.80400 | 46.6 |
| 7 | 13.250 | 5.70 | — | — |
| 8 | –17.750 | 1.40 | 1.69680 | 55.5 |
| 9 | 17.750 | 3.20 | 1.84666 | 23.8 |
| 10 | –218.700 | 40.12–5.09–5.80 | — | — |
| 11 | –27.170 | 1.40 | 1.69680 | 55.5 |
| 12 | –249.207 | 4.44–10.13–0.82 | — | — |
| 13 | ∞ | 0.50 | 1.51633 | 64.1 |
| 14 | ∞ | 1.00 | — | — |
| diaphragm | ∞ | 2.80 | — | — |
| 15 | 519.697 | 3.91 | 1.62280 | 57.0 |
| 16 | –33.629 | 0.10 | — | — |
| 17 | 56.804 | 4.20 | 1.56384 | 60.7 |
| 18 | –73.068 | 3.64 | — | — |
| 19 | 35.065 | 7.30 | 1.48749 | 70.2 |
| 20 | –25.071 | 1.60 | 1.71736 | 29.5 |
| 21 | 583.694 | 23.60 | — | — |
| 22 | 47.784 | 2.07 | 1.51633 | 64.1 |
| 23 | –55.896 | 0.10 | — | — |
| 24 | 28.693 | 1.20 | 1.83400 | 37.2 |
| 25 | 10.000 | 1.60 | — | — |
| 26 | 11.292 | 4.00 | 1.51633 | 64.1 |
| 27 | –47.606 | 11.70 | — | — |
| 28 | ∞ | 3.50 | 1.49782 | 66.8 |
| 29 | ∞ | — | — | — |

<Embodiment 2>

A lens arrangement of the zoom lens system having a high zoom ratio according to the second embodiment is shown in FIG. 5. Numerical data regarding the second embodiment is shown in Table 2 below. Aberrations at the shortest focal length extremity, an intermediate focal length, and the longest focal length extremity are shown in FIGS. 6A through 6D, 7A through 7D and 8A through 8D, respectively.

TABLE 2

$F_{NO}$ = 1:1.7–1.7–2.4
f = 8.24–40.00–116.50
ω = 26.8–5.5–1.9
$f_B = d_{27} + d_{28} = 15.33$

| surface No. | r | d | N | ν |
|---|---|---|---|---|
| 1 | 110.903 | 2.00 | 1.80518 | 25.4 |
| 2 | 47.034 | 10.80 | 1.62041 | 60.3 |
| 3 | –348.942 | 0.10 | — | — |
| 4 | 44.732 | 5.80 | 1.71299 | 53.9 |
| 5 | 146.536 | 0.92–30.26–38.86 | — | — |
| 6 | 77.586 | 1.30 | 1.80400 | 46.6 |
| 7 | 13.250 | 5.70 | — | — |
| 8 | –17.750 | 1.40 | 1.69680 | 55.5 |
| 9 | 17.750 | 3.20 | 1.84666 | 23.8 |
| 10 | –218.700 | 40.11–5.08–5.80 | — | — |
| 11 | –27.170 | 1.40 | 1.69680 | 55.5 |
| 12 | –249.207 | 4.44–10.13–0.82 | — | — |
| 13 | ∞ | 0.50 | 1.51633 | 64.1 |
| 14 | ∞ | 1.00 | — | — |
| diaphragm | ∞ | 2.80 | — | — |
| 15 | –401.207 | 3.73 | 1.62280 | 57.0 |
| 16 | –31.447 | 0.10 | — | — |
| 17 | 73.718 | 4.20 | 1.56384 | 60.7 |
| 18 | –59.425 | 0.43 | — | — |
| 19 | 41.057 | 7.00 | 1.48749 | 70.2 |
| 20 | –29.107 | 1.60 | 1.78472 | 25.7 |
| 21 | –170.680 | 27.62 | — | — |
| 22 | 44.369 | 2.20 | 1.51633 | 64.1 |
| 23 | –318.660 | 0.10 | — | — |
| 24 | 33.558 | 1.20 | 1.83481 | 42.7 |
| 25 | 11.169 | 1.01 | — | — |
| 26 | 12.758 | 4.00 | 1.51633 | 64.1 |
| 27 | –27.711 | 11.83 | — | — |
| 28 | ∞ | 3.50 | 1.49782 | 66.8 |
| 29 | ∞ | — | — | — |

<Embodiment 3>

A lens arrangement of the zoom lens system having a high zoom ratio according to the third embodiment is shown in FIG. 9. Numerical data regarding the third embodiment is shown in Table 3 below. Aberrations at the shortest focal length extremity, an intermediate focal length, and the longest focal length extremity are shown in FIGS. 10A through 10D, 11A through 11d and 12A through 12D, respectively.

TABLE 3

$F_{NO}$ = 1:1.7–1.7–2.4
f = 8.24–40.00–116.50
ω = 27.0–5.6–1.9
$f_B = d_{25} + d_{26} = 15.22$

| surface No. | r | d | N | ν |
|---|---|---|---|---|
| 1 | 109.125 | 2.00 | 1.80518 | 25.4 |
| 2 | 46.966 | 10.80 | 1.62041 | 60.3 |
| 3 | –400.600 | 0.10 | — | — |
| 4 | 45.570 | 5.80 | 1.72916 | 54.7 |
| 5 | 152.064 | 0.93–30.26–38.85 | — | — |
| 6 | 77.586 | 1.30 | 1.80400 | 46.6 |
| 7 | 13.250 | 5.70 | — | — |
| 8 | –17.750 | 1.40 | 1.69680 | 55.5 |
| 9 | 17.750 | 3.20 | 1.84666 | 23.8 |
| 10 | –218.700 | 40.11–5.09–5.81 | — | — |
| 11 | –27.170 | 1.40 | 1.69680 | 55.5 |
| 12 | –249.207 | 4.44–10.13–0.81 | — | — |

TABLE 3-continued

| | | | | |
|---|---|---|---|---|
| 13 | ∞ | 0.50 | 1.51633 | 64.1 |
| 14 | ∞ | 1.00 | — | — |
| diaphragm | ∞ | 2.80 | — | — |
| 15 | 392.892 | 3.80 | 1.65844 | 50.9 |
| 16 | −35.200 | 0.10 | — | — |
| 17 | 60.900 | 4.00 | 1.62280 | 57.0 |
| 18 | −86.000 | 2.65 | — | — |
| 19 | 37.980 | 6.00 | 1.51633 | 64.1 |
| 20 | −32.200 | 1.80 | 1.84666 | 23.8 |
| 21 | ∞ | 27.29 | — | — |
| 22 | 18.878 | 1.30 | 1.83481 | 42.7 |
| 23 | 10.330 | 1.27 | — | — |
| 24 | 11.780 | 5.10 | 1.48749 | 70.2 |
| 25 | −24.678 | 11.72 | — | — |
| 26 | ∞ | 3.50 | 1.49782 | 66.8 |
| 27 | ∞ | — | — | — |

Numerical values of the relationships (1) through (9) corresponding to three embodiments are shown in Table 4 below.

TABLE 4

| | Embodiment 1 | Embodiment 2 | Embodiment 3 |
|---|---|---|---|
| Relationship (1) | 0.34 | 0.34 | 0.34 |
| Relationship (2) | 0.30 | 0.30 | 0.30 |
| Relationship (3) | 1.07 | 1.07 | 1.07 |
| Relationship (4) | 0.61 | 0.63 | 0.60 |
| Relationship (5) | 1.71 | 1.68 | 1.98 |
| Relationship (6) | −0.22 | −0.25 | −0.25 |
| Relationship (7) | 0.61 | 0.59 | 0.65 |
| Relationship (8) | −2.08 | −1.99 | −1.25 |
| Relationship (9) | 2.86 | 3.35 | 3.31 |

As can be seen from Table 4 above, the first through third embodiments satisfy the requirements specified in relationships (1) through (9). It can also be seen that the aberrations are appropriately corrected.

As can be understood from the above discussion, according to the present invention, a small and high performance zoom lens system having a high zoom ratio of approximately 15 and a high aperture ratio of approximately 1.7 can be provided.

What is claimed is:

1. A zoom lens system, comprising:

a first lens group having a positive power;

a second lens group having a negative power and a magnification varying function, said second lens group being movable during a zooming operation;

a third lens group having a negative power and a focus compensating function, said third lens group being movable during said zooming operation; and, a fourth lens group having a positive power and an image forming function, said fourth lens group not being movable during said zooming operation, wherein said first, second, third, and fourth lens groups are arranged in this order from an object side, said fourth lens group being comprised of a first sub-lens group and a second sub-lens group each having a positive power, in this order from said object side, said first sub-lens group and said second sub-lens group having a predetermined distance therebetween, and further wherein said zoom lens system satisfies the following relationships:

$$0.25 < L_{w2\text{-}3}/f_T < 0.4$$

$$0.2 < |m_{2W}| < 0.4 \ (m_{2W} < 0)$$

$$1.0 < |m_4| < 1.4 \ (m_4 < 0)$$

$$0.5 < m_{4b} < 0.9$$

$$1.3 < f_4/f_{4a} < 2.5$$

wherein $L_{w2\text{-}3}$ represents a distance between said second lens group and said third lens group at a shortest focal length extremity, $f_T$ represents a focal length of the whole lens system at a longest focal length extremity, $m_{2W}$ represents a lateral magnification of said second lens group at said shortest focal length extremity, $m_4$ represents a lateral magnification of said fourth lens group, $m_{4b}$ represents a lateral magnification of said second sub-lens group of said fourth lens group, $f_4$ represent a focal length of said fourth lens group, and $f_{4a}$ represents a focal length of said first sub-lens group of said fourth lens group.

2. The zoom lens system according to claim 1, wherein said first sub-lens group of said fourth lens group comprises a positive first lens element, a positive second lens element, and a cemented lens consisting of a positive lens element and a negative lens element, in this order from said object side, and further wherein the following relationship is satisfied:

$$-0.35 < f_{4a}/f_{4ac} < -0.15$$

wherein $f_{4ac}$ represents a focal length of a cementing surface of said cemented lens belonging to said first sub-lens group of said fourth lens group, represented by the following relationship:

$$f_{4ac} = r_c/(N'-N)$$

wherein $r_c$ represents a radius of curvature of said cementing surface,

N' represents a refractive index of the lens element located closer to an image surface than said cementing surface at the d-line, N represents a refractive index of the lens element located closer to said object side than said cementing surface at the d-line.

3. The zoom lens system according to claim 1, wherein said second sub-lens group of said fourth lens group comprises a positive lens element, a negative lens element and a positive lens element, in this order from said object side, and further wherein the following relationships are satisfied:

$$0.4 < f_{4a}/f_{4b} < 0.8$$

$$-2.5 < f_{4a}/f_{4bN} < -1.0$$

$$2.0 < L_{4ab}/f_W < 4.0$$

wherein $f_{4b}$ represents a focal length of the second sub-lens group of said fourth lens group, $f_{4bN}$ represents a focal length of said negative lens element of said second sub-lens group of said fourth lens group, $f_W$ represents a focal length of the whole lens system at said shortest focal length extremity, and $L_{4ab}$ represents a distance between said first sub-lens group and said second sub-lens group.

4. The zoom lens system according to claim 1, wherein said second sub-lens group of said fourth lens group comprises a negative lens element and a positive lens element, in this order from said object side, and further wherein the following relationships are satisfied:

$$0.4 < f_{4d}/f_{4b} < 0.8$$

$$-2.5 < f_{4b}/f_{4bN} < -1.0$$

$$2.0 < L_{4ab}/f_W < 4.0$$

wherein $f_{4b}$ represents a focal length of said second sub-lens group of said fourth lens group $f_{4bN}$ represents a focal length of said negative lens element of said second sub-lens group, $f_W$ represents a focal length of the whole lens system at said shortest focal length extremity, and $L_{4ab}$ represents a distance between said first sub-lens group and said second sub-lens group.

5. The zoom lens system according to claim 1, further comprising a diaphragm provided between said third lens group and said fourth lens group, said diaphragm not moving during said zooming operation.

* * * * *